United States Patent

[11] 3,608,644

| [72] | Inventor | Edward B. Ambrose |
| | | 103 Mayfair Place, Chicago Heights, Ill. 60411 |
| [21] | Appl. No. | 849,328 |
| [22] | Filed | Aug. 12, 1969 |
| [45] | Patented | Sept. 28, 1971 |

[54] WEEDING TOOL
8 Claims, 9 Drawing Figs.

[52] U.S. Cl. ............................................. 172/378,
294/50.9, 172/720, 254/132
[51] Int. Cl. ............................................. A01b 1/16
[50] Field of Search ........................................ 172/329,
373, 374, 375, 377, 378, 371, 379, 380, 381, 765,
766, 772, 71 A, 720; 294/50.8, 50.9; 30/124;
254/132

[56] References Cited
UNITED STATES PATENTS

| 1,751,481 | 3/1930 | Tourrette | 30/124 |
| 1,973,417 | 9/1934 | Rieff | 294/50.9 |
| 2,244,917 | 6/1941 | Muller | 294/50.9 |
| 2,806,733 | 9/1957 | Hund | 30/124 |
| 2,901,280 | 8/1959 | Hall | 294/50.8 |

*Primary Examiner*—Robert E. Pulfrey
*Assistant Examiner*—C. W. Hanor
*Attorney*—Harbaugh and Thomas

ABSTRACT: A tool is disclosed for digging weeds having a handle member with a root-cutting and extracating blade at one end with a pair of spaced spring tines held adjacent to and spaced from the cutting blade from a pivoted bracket member that is biased to resiliently hold the tines in adjacency to the cutting blade. The bracket allows the tines upon contact with the ground to spring upwardly over the top of any outspread parts of the plant as the cutting blade severs the root upon being thrust into the ground. As the tool is removed the plant or weed is automatically held between the tines and the blade for easy disposal.

PATENTED SEP 28 1971 3,608,644
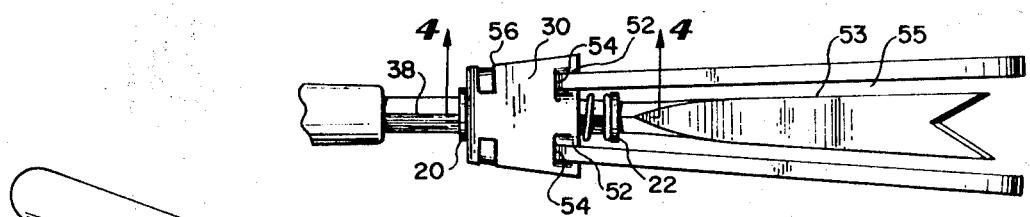
FIG. 2
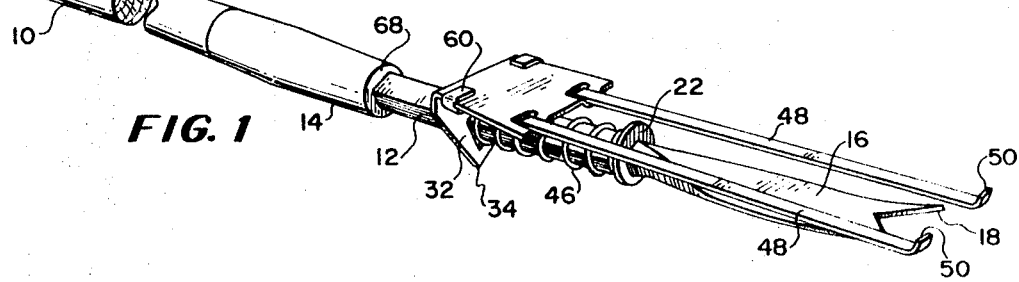
FIG. 1
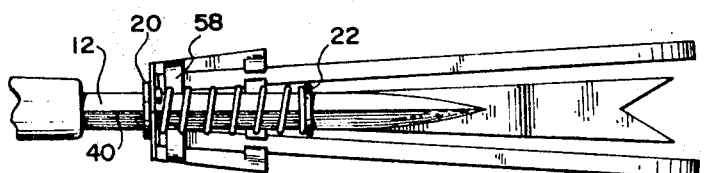
FIG. 3    FIG. 9
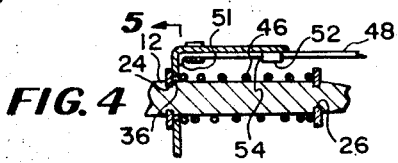
FIG. 4
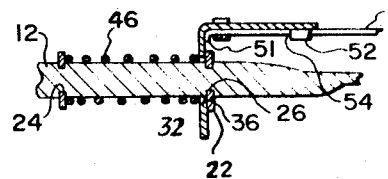
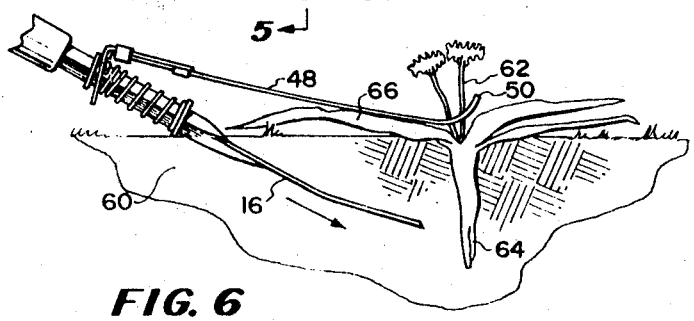
FIG. 6
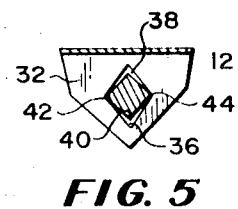
FIG. 5
FIG. 7
FIG. 8
INVENTOR
EDWARD B. AMBROSE
By Harbaugh and Thomas
Attorneys
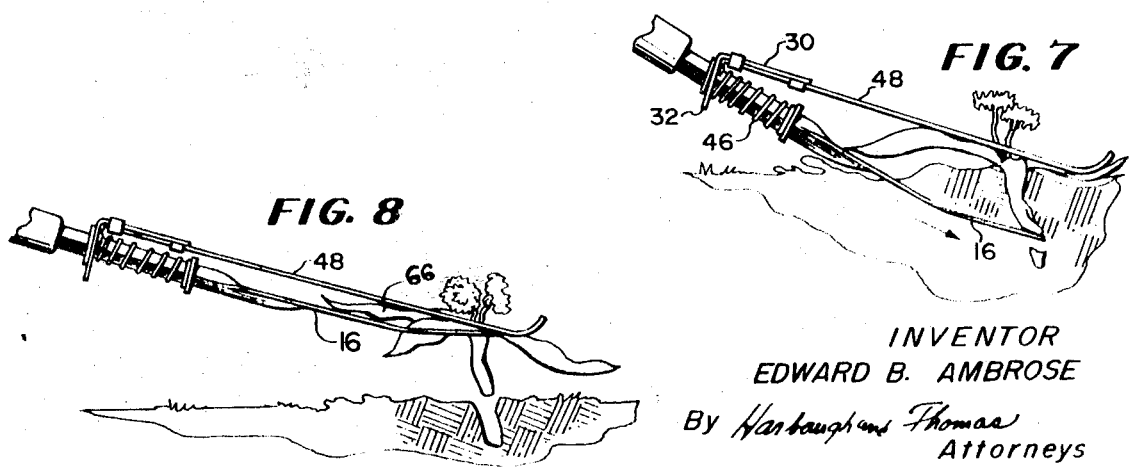

WEEDING TOOL

BACKGROUND OF THE INVENTION

A wide variety of garden tools are known in the art and presently being marketed for home and truck farm use. A number of weeding tools are known and available that have means for clamping upon the severed weed so that it is retained by the tool and the process of weeding is thereby facilitated. In one form of prior art weeding tool, pivoted downwardly depending claws are provided which retain the weed by gravity and release the weed by upending the tool so that the claws release. The operability of such a tool depends upon fixed fingers that operate between the claws to sweep out the weed as the claws pivot to the release position.

In another weeding tool the downwardly depending claws are urged to the open position by a spring-loaded sleeve which is affixed to the blade, and also reciprocable. As this tool engages the ground, the sleeve is pushed back by the blade and the pivoted claw is urged downwardly upon the base of the cutting tool. One disadvantage of this tool is that retention of the weed plant depends upon the continued pressure of the cutting tool upon the ground. Once the pressure is released the claw releases the weed, often prematurely for facilitated handling of the severed weed. Other weeding tools depend upon hand-operated levers and push-pull rods to activate the weed holding claws. In still other tools the cutting blade is spring-mounted and weed-retaining tongs are stationary. Pressure against the ground brings the blade and weed to the tongs. Here again release of the weed is not coordinated.

SUMMARY OF THE INVENTION

The present invention concerns a lightweight weeding tool which is easy to use, of simple and sturdy construction and which eliminates the disadvantages of the prior art tools. More particularly the invention concerns a weeding tool having a pair of strong spring steel tines above the cutting blade which are affixed to a spring-loaded bracket and adapted to be opened away from the cutting blade by sliding contact with the ground as the blade is thrust into the root of or under the base of the weed. Then as the tool is levered upwardly by the handle, the tines return by the combined spring action of the tines and the bracket to impinge against any overlapping parts of the plant. No pressure or levers are necessary to hold the plant and lightness of weight of the tool allows the gardener to easily retrieve the weed or fling it off into a basket by a simple jerking action. The tines act as the pressure against the ground is released or the angle of the handle to the ground is changed which allows a coordinated movement of the tool in cutting and extracting weeds from the ground. In other words the tool is used just as if the retaining tines were not there and the weed is automatically retained no matter how carelessly the cutting tool is thrust under a weed and into its roots.

DESCRIPTION OF THE DRAWINGS

Illustrative embodiments of the invention are shown in the drawings wherein:

FIG. 1 is a perspective view of the weeding tool of this invention with the handle foreshortened in fragmentary illustration;

FIG. 2 is a fragmentary top plan view of the tool shown in FIG. 1;

FIG. 3 is a fragmentary bottom plan view of the tool shown in FIG. 1;

FIG. 4 is a cross-sectional view taken along the lines 4—4 of FIG. 2;

FIG. 5 is a cross-sectional view taken along the lines 5—5 of FIG. 4;

FIGS. 6, 7 and 8 are fragmentary plan views of the tool of this invention showing respectively the initial thrust into the ground at the base of a weed, the action of the tines as the weed is severed by the cutting blade and the action of the tines as the weed is lifted from the ground; and FIG. 9 is a side plan view of another embodiment of the invention showing an alternative mounting for the bracket.

THE PREFERRED EMBODIMENT

Referring to FIGS. 1, 2 and 3 the weeding tool of this invention is shown to comprise the hardwood handle 10 having the square shank 12 affixed within the end thereof and secured by the metal collar 14 in a manner known to the art. The shank 12 terminates in an integral flat blade 16 having the conventional V-notched cutting blade 18, the edges of which are sharpened.

The pressed-fitted 12, as before mentioned, is square in cross section and is provided with a pair of spaced washers or flanged collars 20 and 22 that are preferably press-fitted thereon in fixed positions and are retained by the peripheral recesses 24 and 16 (FIG. 4) respectively formed in the shank 12. The washers 20 and 22 can be formed of split lockwashers pressed into a flat configuration with their inner edges engaging within the recesses 24 and 26. Any form of spaced abutments or circumferential shoulders as represented by the washers 20 and 22 can be used.

The bracket 30 has the downwardly depending flange 32 which is tapered to the 34 to remove excess material and lighten the assembly. The flange 32 has the diamond-shaped opening 36 encompassing the square shank 12 in such a manner as to be pivotally mounted on an axis perpendicular to the shank and substantially in the plane of the blade 16. The opening 36 is so shaped that it is spaced from the top and bottom corners 38 and 40 of the shank as illustrated in FIG. 5 but fits against the corners 42 and 44 to form the pivot points. The bracket 30 thus has its greatest pivot action in a direction to and from the ground with a more limited side-by-side movement, if any.

Interposed between the inner face of the flange 32 and the washer 22 is the compression spring 46 encompassing the shank 12. In this position the spring 46 is under sufficient compression to hold the flange 32 flat against the washer 20.

A pair of spring steel tines 48 is attached to the bracket 30. The tines are flat and essentially straight along their lengths except for the upturned tips 50 and the downturned inner ends 51. Although any means may be used to affix the tines to the bracket as by rivets, etc., one form of attachment is illustrated wherein the forward edge of the bracket has the pair of spaced saddles 52 with the opening 54 at their back edges to encompass the tines in supporting relationship. The saddles 52 and slits 54 are press-formed into the edge of the bracket. The tines are affixed in a spread position so that their inner edges are about equally spaced along the flared edge 53 of the tool face 16. Thus the spacing 55 is substantially equal in the normal attitude of the tool. Each side edge of the bracket 30 is notched as at 56, just forward of the flange 32 to receive the C-clamp or cleat 58 which encompasses the inner ends of the tines 48 just forward of their downturned ends 51 and as illustrated the ends 60 of the cleat 58 wraparound and in the slots 56 and over the top of the bracket 30. The body of the cleat 58 clamps the tines to the underside of the bracket and is spaced from the spring 46. The cleat 58 is machine clamped therein by suitable die so that a tight fit is accomplished. Similarly the saddles or cleats 52 are formed around the tines at the front of the bracket.

In using the weeding tool as illustrated in FIGS. 6, 7 and 8 the gardener thrusts the blade 16 into the ground illustrated at 60 at an oblique angle adjacent to the weed illustrated at 62 in order to cut off the root 64. In so doing the tines 48 slide along the ground aided by the upturned ends 50 and straddle the main stalk of the weed. The tines pass over some of the leaves 66 and branches of the weed 62 and are forced upwardly away from the blade which action pivots the bracket 30, upwardly from the blade, compresses the spring 46 and bends the tines slightly.

When the root 64 is severed (FIG. 7) the main part of the weed 62 including some of the leaves 66 is now between the tines 48 and the bracket 30 has hinged to about the limits of the space at the corner opening 36. The tool is now raised and under the spring action of the tines and the force of the spring 46 the weed is entrapped as illustrated in FIG. 8 between the tines and the top of the blade 16.

In FIG. 9 a modified arrangement is shown wherein the bracket 30 and its flange 32 are mounted between the forward end of the spring 46 and the forward washer 22. The same or equivalent spring action and pivotal movement is attained. It is also apparent that the shoulder 68 of the collar 14 (FIG. 1) can be used as the back plate or stop for the flange 32 and the spring 46 extends from the forward side of the flange 32 to the washer 22 in which event the washer 20 is eliminated.

From this description it is apparent that the weeding tool can have any form of cutting edge and the V-notch edge 18 is merely illustrative. The pair of tines 48 are transversely pivoted to the shank in such a manner as to extend in spaced relationship from each other and along the shank over the blade, and means are provided to bias the tines about the pivot toward the cutting edge, with the bracket holding the tines in spaced relationship therewith. The spring means allows the tines to pivot upwardly upon contact with the ground as the blade is thrust into the ground to thereby receive and retain a weed between the tines and the blade as the tool disengages the weed from the ground. The weed parts such as the leaves 66 can be caught between any part of the tines and any part of the blade 16. This retention need be only of sufficient holding force to carry the weight of the weed as it is transferred to a basket or until it is pulled out by hand.

What is claimed is:

1. A weeding tool including:

an element having a shank portion with a blade and cutting edge at its front end adapted to engage and sever the stem of a weed;

a pair of spaced stop means carried by said shank portion;

a bracket member slidably carried by said shank portion between said spaced stop means;

means providing limited pivotal movement of said bracket member on an axis transverse to said shank member;

a pair of tines supported by said bracket and extending in spaced relationship from each other above and along said shank portion;

the terminal ends of said tines being upturned in the region of said cutting edge; and resilient means between one of said stop means and said bracket urging said bracket against the other stop means whereby said tines are biased against pivotal movement on said shank portion upon contact of said terminal ends of said tines with the ground as said blade is thrust thereon to sever the weed stem and thereby retain said weed between the tines and blade as the tool disengages a weed from the ground.

2. A weeding tool in accordance with claim 1 in which:

said resilient means comprises a spring member encompassing said shank member urging said bracket member against one of said stop members;

said bracket member is provided with an aperture encompassing said shank member in slidable relationship on the longitudinal axis thereof; and the transverse sides of said shank member pivotally engaging said aperture and the vertical sides thereof being spaced from said shank member to provide space for said pivotal movement.

3. A weeding tool including:

an element having a cutting edge at its front and adapted to engage and sever the stem of a weed;

a pair of tines supported by said element and extending in spaced relationship from each other above and along said element;

said tines being transversely pivoted and slidably mounted to said element at one end between spaced shoulders thereon and having their extended ends adjacent to and laterally spaced on each side of said cutting edge and with their extended ends beyond the outermost part of said cutting edge; and coil spring means encompassing said element biasing said tines about said pivot against one of said shoulders toward said cutting edge and allowing said tines to pivot upwardly upon contact with the ground as said blade is thrust into the ground whereby a weed is received and retained between the tines and the blades as the tool disengages a weed from the ground.

4. A weeding tool comprising:

a shank member having a blade portion with a cutting edge at its front adapted to engage and sever the stem of a weed:

a pair of spaced shoulders on said shank member;

a bracket having a depending member encompassing said shank member between said shoulders;

a pair of tines supported at one end to said bracket and extending in spaced relationship from each other above and along said shank member to said blade portion;

said depending member being pivotally mounted on an axis substantially normal to said shank member and laterally spaced from said cutting edge;

compression spring means between one of said shoulders and said depending member biasing and resiliently holding said tines so as to pivot upwardly upon contact with the ground as said blade is thrust therein whereby a severed weed is received and retained between the tines and said blade portion.

5. A weeding tool in accordance with claim 4 in which:

a. said depending member is provided with an aperture encompassing said shank; and b. said shank has opposed edges engaging opposite sides of said aperture as pivot points for said bracket.

6. A weeding tool in accordance with claim 5 in which:

a. said shank is essentially square in cross section; and b. said aperture in said depending member is quadrilateral with one diagonal substantially equal to the diagonal of said shank to engage same as the pivot axis.

7. A weeding tool comprising:

a. a handle member;

b. a shank extending from said handle member;

c. said shank having a pair of side opposite corners along a portion of the length thereof and a flat flared blade with a terminal cutting edge;

d. a flange on said shank on each side of said cornered portion;

e. a pair of spaced tines having a base member with a depending tab;

f. an aperture in said tab encompassing said shank and in pivoted contact with said side corners;

g. spring means between one of said flanges and said tab supporting said tines in resilient pivotal relationship from said base member; and h. said tines having upturned ends extending in spaced relationship above said cutting edge whereby to engage portions of a severed weed against said blade.

8. A weeding tool in accordance with claim 7 in which:

a. said shank is quadrilateral in cross section;

b. said aperture in said tab has opposing corners of said shank portion as said pivoted contact; and c. said spring means comprises a compression spring encompassing said shank between one of said flanges and said tab member.